Figure 1:
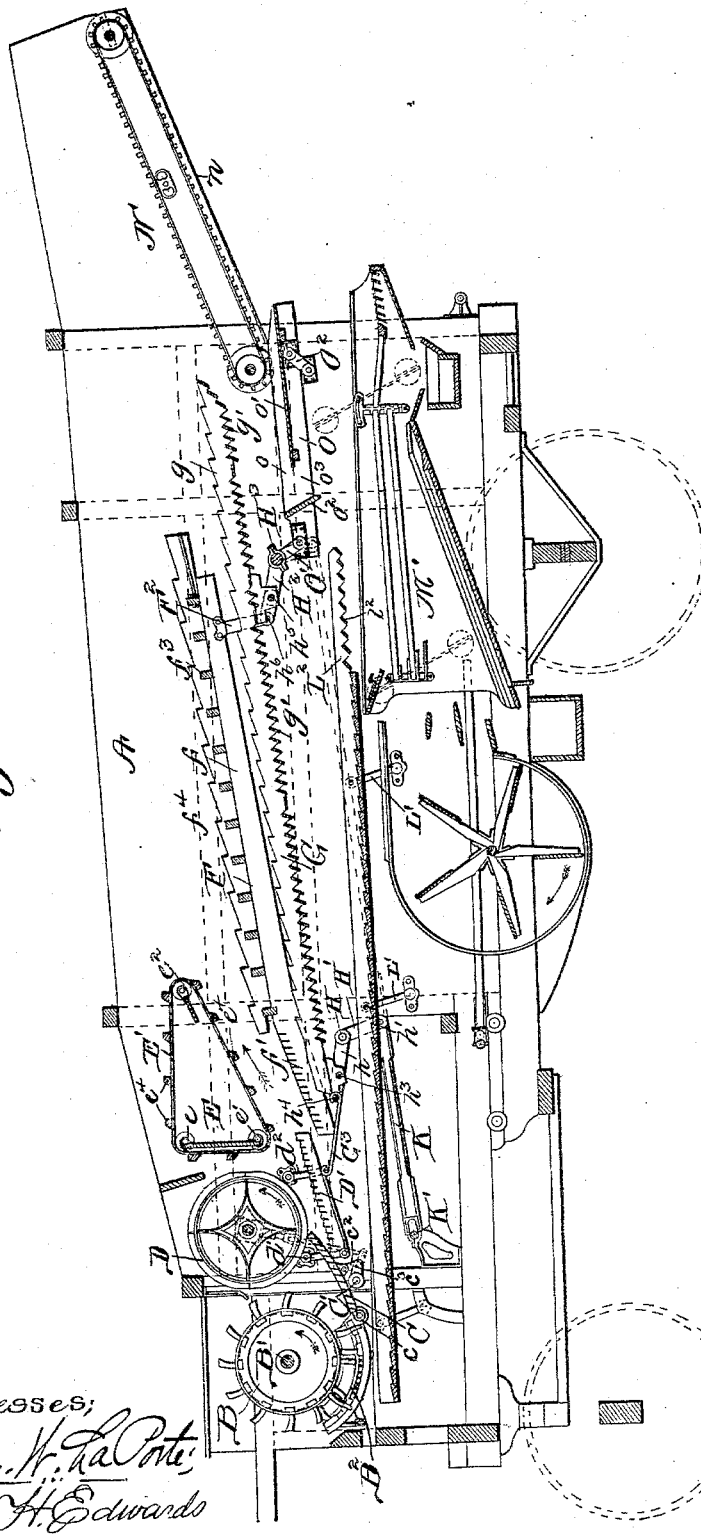

(No Model.) 3 Sheets—Sheet 1.

G. E. WILSON.
THRASHING MACHINE.

No. 546,372. Patented Sept. 17, 1895.

Witnesses:
Chas. W. LaPorte
W. H. Edwards

Inventor:
George E. Wilson
by H. Bliss
his Att'y (No Model.)  3 Sheets—Sheet 2.
G. E. WILSON.
THRASHING MACHINE.
No. 546,372.  Patented Sept. 17, 1895.
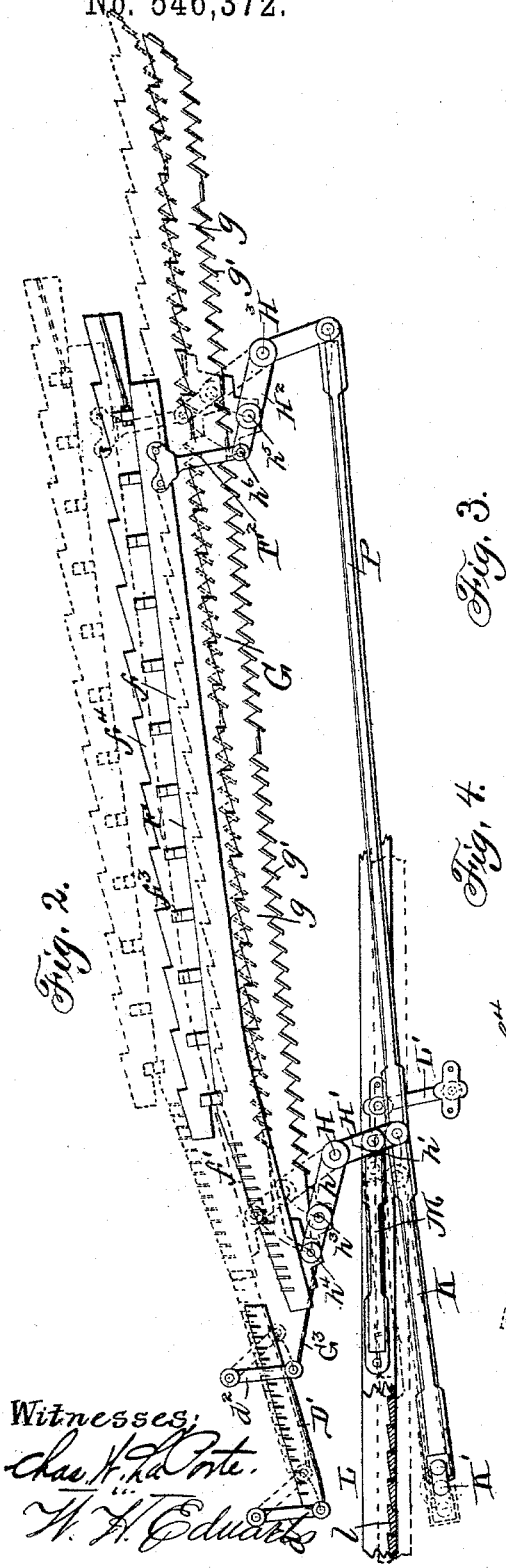
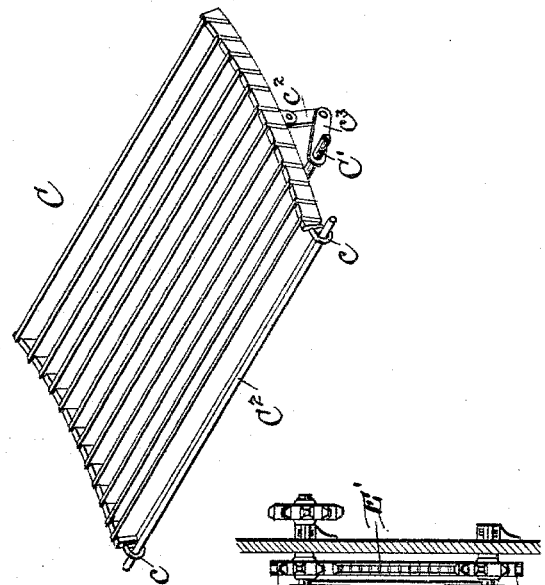
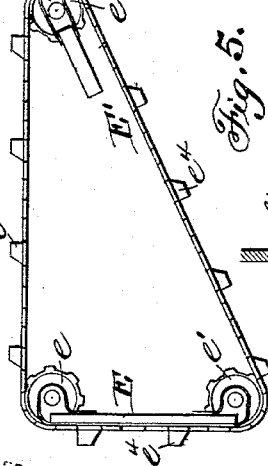
Witnesses:
Chas. W. La Porte
W. H. Edwards
Inventor,
George E. Wilson
By H. H. Bliss
his Att'y (No Model.) 3 Sheets—Sheet 3.
G. E. WILSON.
THRASHING MACHINE.
No. 546,372. Patented Sept. 17, 1895.
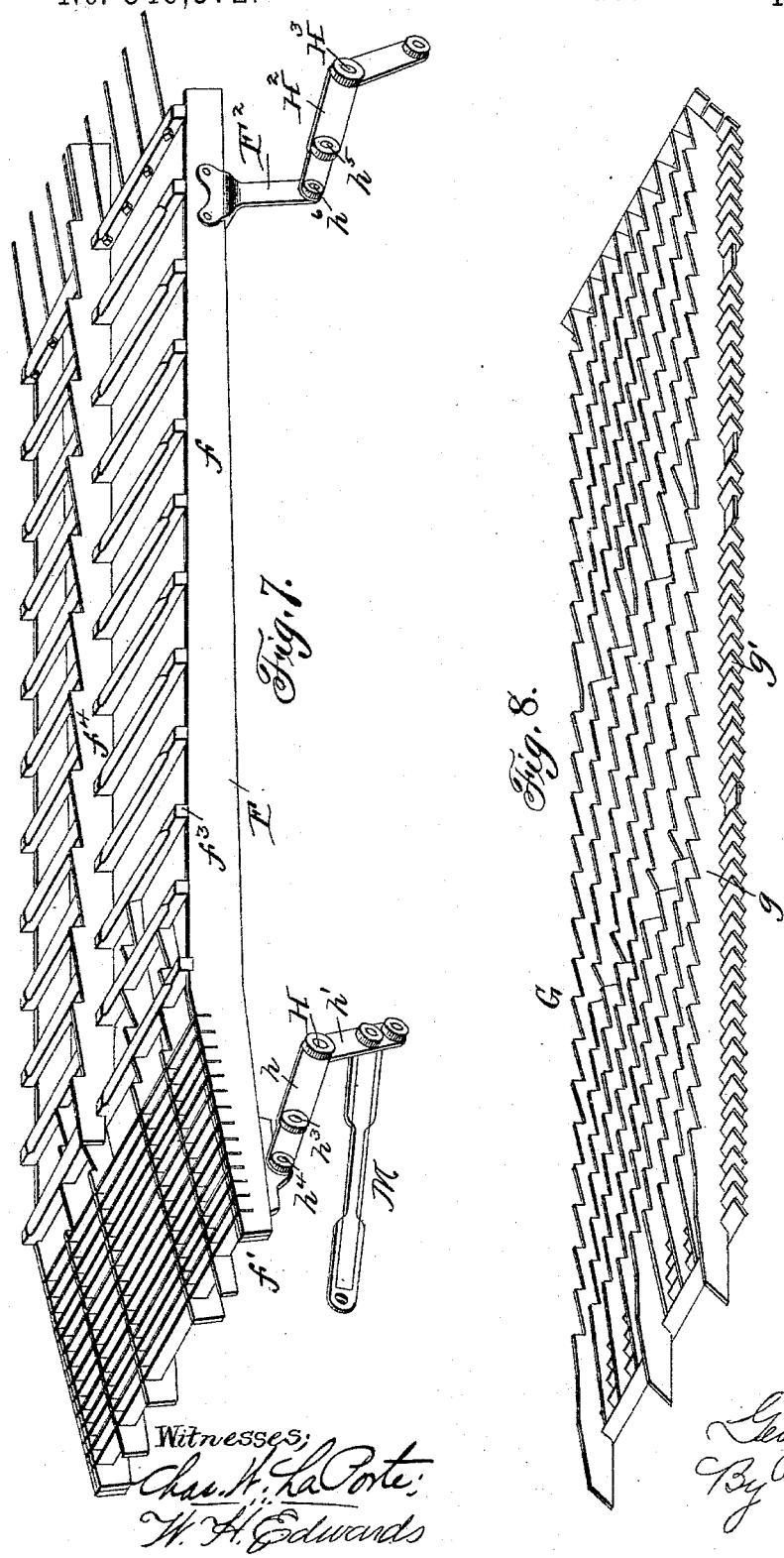
Witnesses:
Chas. H. LaPorte
W. H. Edwards
Inventor,
George E. Wilson
By R. H. Bliss
his Att'y.
ANDREW B.GRAHAM. PHOTO-LITHO. WASHINGTON,D.C.

UNITED STATES PATENT OFFICE.

GEORGE E. WILSON, OF STILLWATER, MINNESOTA.

THRASHING-MACHINE.

SPECIFICATION forming part of Letters Patent No. 546,372, dated September 17, 1895.

Application filed November 16, 1894. Serial No. 529,023. (No model.)

*To all whom it may concern:*

Be it known that I, GEORGE E. WILSON, a citizen of the United States, residing at Stillwater, in the county of Washington and State of Minnesota, have invented certain new and useful Improvements in Thrashing-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a longitudinal section of a thrashing-machine embodying my improvements. Fig. 2 is a side view of the two straw-tables and their actuating devices detached. Fig. 3 is a perspective of the grate behind the concave. Fig. 4 is a side or edge view of the curtain or device for stopping the backward motion of the grain-berries. Fig. 5 is a front view of the parts in Fig. 4. Fig. 6 shows the grate behind the concave and its actuating devices. Fig. 7 is a perspective of the upper straw-table. Fig. 8 is a perspective of the lower straw-table.

In the drawings I have shown a machine having a framework with a housing and casing of the usual character, as is indicated at A. At the front end there is a thrashing-cylinder B, which also may be of the ordinary kind, it being mounted on the shaft $B'$ and having below it the toothed concave $B^2$.

Immediately behind the concave I place a grate C, which in dimensions and general shape may be more or less similar to the grates now in use; but one of the principal aims of the present invention, and a matter to which I have devoted considerable experiment and attention for a long time, is a simple construction and arrangement of parts which shall much more efficiently open up or disintegrate the masses of straw and remove therefrom all of the grain-berries, and I begin the action upon the material for this purpose at the grate. The latter part is hinged at its forward or outer edge, it having eyes $c$, fitted to a cross-shaft or pintles $C^2$. The longitudinal bars of the grate are connected by vertical cross-bars with spaces between them through which the grain-berries can drop. $C'$ is a transverse shaft mounted in a framework under the grate. It extends to the outside of the casing and is connected by a link $c^5$ to the strap or box of an eccentric on the beater-shaft, there being a crank-arm $c'$, by which the link effects the rocking of the shaft $C'$. Inside of the casing there are crank-arms $c^3$, to which are pivoted links $c^2$, and the latter are in turn pivoted to the under side of the grate.

When the machine is in operation, the masses of straw received from the thrashing-cylinder are subjected to a series of rapid shakes or blows from the grate vibrated at high speed by the beater-shaft. On lines immediately adjacent to the cylinder the vibratory movements are at the minimum, and consequently the rapid escape of the straw from the cylinder is not interfered with; but as it passes backward it is subjected to a gradually-increasing shaking and beating, which results, as I find, in the separation of a large quantity of the grain which in other machines has been carried with the straw to the separator parts farther to the rear.

Earlier machines have been made in various ways with shaking devices behind the cylinder and concave to receive the straw; but I do not know of any in which a grate has been used which vibrates with a great rapidity and is supported and actuated independently of the more slowly moving parts, such as the grain-pan and the main straw-table proper.

Immediately above the rear edge of the vibrating grate I arrange the revolving beater-drum D, which is formed with deep cavities and radially-arranged beater-blades, the cavities being rounded at the inner sides, so as to insure the ready escape of the straw. This beater is revolved with great rapidity and, as is well known, has a tendency to engage with the berries of grain as they are separating from the straw and throw them upward toward the cover of the machine and deposit them on top of the masses of straw. To obviate this, use has generally been made in thrashing-machines of curtains—that is, thin depending partitions placed behind the beater in such position as to intercept the flying grain-berries and compel them to drop downward. The objections incident to them are that to be effective they must be extended down to a relatively low horizontal line, and that, consequently, they act to more or less temporarily stop the straw immediately behind the beater, until quantities accumulate in piles or lumps large enough to exert a backward pressure on the curtain sufficient to displace it to permit them to pass. It is unnecessary to dwell upon the numerous disadvantages in the operation of the machine and in the treatment of the material which results therefrom, they being obvious.

To retain all of the advantages incident to a vertical curtain and at the same time overcome the difficulties referred to I have combined with it means for uniformly advancing the straw after it leaves the beater and preventing it from accumulating at that point. The devices for accomplishing this consist of a vertical partition or wall, as at E, and an endless carrier E', arranged to travel at the front in substantially vertical lines down to a line conveniently near to the separating devices and thence backward and upward at an inclination. The carrier may be formed as an open rake with chains mounted on the sprocket-wheels $e$, $e'$, and $e^2$ and having the cross-bars $e^4$, the whole adapted to uniformly and smoothly engage with the straw behind the beater and drag or push it in a stream or sheet backward toward the separator-table; or it may be a practically continuous wide belt or apron (one or more) adapted to provide the vertical wall at E to receive the impinging grain and having bars or projections for engaging with and carrying backward the straw.

Immediately below the rear part of the beater and the shield or grain-deflecting device I place a vibrating separating-table D', the forward edge of which lies well under the rear edge of the vibrating grate. It is suspended by means of links $d'$ $d^2$ and is formed of one or more longitudinal bars having thin vertically-arranged cross slats or bars at the top. Links $G^3$ extend backward from the links $d^2$ and receive motion from vibrating parts, to be described. The machine in this respect is materially different from those heretofore in use which have one or more prolonged separating-tables, each extending from points near the end of the machine to or under the grate.

It will be seen that the short table D' is so arranged that the greater part of its action is to advance the straw while the latter is being acted on by the beater, this being in contradistinction to an arrangement thereof which would mainly result in lifting the straw up, (as is done by the separating-tables to be described.) In other words, the preliminary reciprocating table D' holds the straw up to and assists the beater in uniformly spreading and advancing it, the table having no material vertical movement, its parts being approximately tangential to the beater. At its rear edge it overhangs somewhat the forward edge of the long separating-table, both to prevent interference therewith and also to provide a free passage-way for the grain-berries, the detached heads, &c., which at this point of the machine are ready to move downward in large quantities and should be removed as rapidly as possible from the straw.

The longer separating mechanism comprises two tables F and G. These are swung on the same rocking mechanism, but with different radii. The upper table F has a main or upper portion $f$, inclined backward, and a front shorter portion $f'$, inclined more sharply and extending to a line that is a continuation of table D' when tables are at their upthrow, the part $f'$ having thin cross-slats and the former having thicker or heavier bars $f^3$, together with serrated longitudinal bars $f^4$ for advancing the straw.

The lower table has longitudinal bars $g$, serrated at their upper edges, and has at the bottom thereof inclined cross-bars $g'$. These tables are supported and moved as follows: H is a rock-shaft under the forward or inner ends of the tables F and G. Upon it are rocker arms or levers H', one upon each side of the machine. Each lever has an upward-extending arm $h$, and another at $h'$, which extends downward. The bar $h$ has two pivots $h^3$ $h^4$, the former connecting it to the table G and the latter connecting it to table F.

Beneath the rear ends of the tables there are similar rocker-arms H², with pivots $h^5$ $h^6$. That at $h^5$ connects arm H² to the lower table G in such way as to provide a radius of movement the same as that at $h$ at the front end. The upper table is not connected directly to the rocker-arm H², but has an arm F², (on each side,) which is practically a continuation of the side of table F down to the rocker-arm at $h^6$.

Both the tables F and G move together in the same direction around the centers on which they rock; but there is a differential movement imparted to them with respect to their distances from said centers, both the tables moving around them as if they were one of the elements of a parallel-rule joint—that is, its planes being always parallel to the plane through the axes H and H³. The lower table is preferably extended backward somewhat beyond the upper table, so that all of the straw shall pass over its rear end before reaching the carrier which conveys the straw to the stacker. The upper table acts to retain the longer straws and the large masses or lumps thereof and to impart to them a series of upward throws, which gradually increase in force and length, so that as the straw is moved backward it is thoroughly shaken and the masses are disintegrated and ultimately separated or spread into a thin uniform sheet. The shorter straws and smaller masses are received by the lower table F, which moves with shorter throws, but acts to insure the final separation of the grain-berries. Motion is imparted to the tables by links K, hinged to the arms $h'$ of the front rockers and connected to cranks or eccentrics on the shaft K'.

Below the thrashing and separating devices above described the grain-pan L is placed. It is supported by links L', pivoted to its sides, and is reciprocated by the arms $h'$ of the rocker, to which are pivoted pitmen M, which are in turn pivoted to the pan L. This pan L has its horizontal part formed of tongued and grooved slats or boards $l$, which are approximately triangular in section, each having a tongue at the thinner edge and a groove in the thicker edge. When these are fitted together, they furnish a support for the grain having sloping sections with vertical walls at their edges to advance the grain toward the shoe M of the winnower.

To reduce the load on the sieves and fan, the material from the table is compelled to pass down through a slatted floor at $L^2$ at the end of the table, the inclined slats $l^2$ acting to suspend the pieces of straw, heads, &c., and carry them back to points where they can be properly affected by the air-blast.

N is an endless carrier which receives the straw from the tables F and G. Below it is an inclined floor $n$, adapted to receive and carry inward any grain-berries which drop from the straw just before it leaves the machine. N' is a rotary cam-like beater which acts to throw up the carrier and the straw thereon to insure the dropping of the grain which may be moving outward. To receive this grain and also any which may drop from the outer end of the table G, I employ a pan O, having side walls $o$, a bottom or floor $o'$, a guard $o^2$, and a passage at $o^3$. I utilize this pan to counterbalance the tables F and G, it being reciprocated by the parts above described. P is a pitman which extends from the arm $h'$ of the inner rocker to the arm of the outer one. From the rear rocker or from the shaft on which it is mounted there extends downward an arm O', which is hinged to the pan O. Below the pan and hinged to it near the rear end are rocking links $O^2$.

The various parts are so arranged and related that when the tables F and G are moving in one direction the pan O and pan L are moving in the opposite one, and therefore there is a counterbalancing and the movements of all the parts are attained with smoothness and uniformity.

I am aware of the fact that a straw-propelling under acting carrier has been heretofore placed above a reciprocating straw-table, and do not claim such a carrier in the broadest sense as of my invention; but I believe myself to be the first to have arranged a carrier in relation to a grain-deflector and to the beater and the tables in the way in which I have shown and described. The vertically-acting part of it cannot only assist in stopping the upward passage of the grain-berries, but also in catching and moving downward any straw which may tend to be thrown upward by the beater, and the backward-moving part acts, as aforesaid, to prevent the straw from accumulating in masses, and as this latter part travels on upwardly-inclined lines which diverge somewhat from the general longitudinal lines of the straw-table the straw is gradually allowed to expand after it has been well started backward as a stream. The cross-bars or cleats E' are preferably formed with beveled or inclined faces, whereby they are better adapted to check and return the grain-berries and also to engage smoothly with the straw. The rear edge of the table D' normally lies, preferably, below the grain-deflecting parts, and it assists the carrier in starting the straw backward through the throatway between them, the path of this table being approximately parallel to the backward-moving carrier.

The rear edge of the oscillating grate is brought as near as possible to the circles of rotation of the beater, so that all of the straw moving over it shall be subjected to the action of the latter, and the two are made to work in harmony by connecting the beater-shaft, as described, with the parts which move the grate; and there can be adjustment of their relation to each other by providing means for lengthening or shortening the pitman, as shown.

I am also aware of the fact that beaters have been made with cavities, grooves, or recesses in their peripheries, and do not broadly claim them as of my invention; but I at present believe myself to be the first to have constructed one with a body or central part having the peculiar configuration shown—that is to say, with the described radial ribs or webs, which widen as they approach the center—and arranged to furnish relatively deep recesses which shall be rounded at their inner parts, or curvilinear in cross-section, so that the walls can first accomplish their purpose with respect to the straw and grain and then escape therefrom with a reduced effect as to elevating the material.

With respect to the means for connecting the two straw-tables F and G there can be modifications as concerns the details illustrated. By employing bars, as at $F^2$, or their equivalents, the rear bearings for the upper table are situated at distances from the straw-supporting surfaces on the cross-bars greater than the distances of the rear bearings, and such result can be attained by making the longitudinal bars themselves wider and dispensing with the long arms $F^2$.

By examining the drawings it will be seen that the grain pan or receptacle O is so arranged as to deliver material to the shoe at the rear or outer part, and this obviates the overloading of the sieves at any particular place. The material delivered by the pan is apt to contain considerable fine straw and undesirable bodies, and by depositing them in the rear part of the shoe they are subjected to the separating action of the air-blast before they have a chance to commingle with the berries that are delivered in large quantities from the main grain-pan. The deflecting-board $o^3$ not only assists in delivering the material in this way, but also acts to prevent any currents of air striking the material in the pan until it has dropped to such point that it can be advantageously impinged on by the air.

What I claim is—

1. In a thrashing machine, the combination with the thrashing cylinder, the concave, and vibrating separating mechanism, of the grate arranged adjacent to the rear of the concave and supported independently of the main separating mechanism, and means for vibrating such grate at a speed relatively greater than that of the main separating mechanism.

2. In a thrashing machine, the combination with the thrashing cylinder, the concave, and the longitudinally reciprocating straw table behind the cylinder, of the grate hinged at the rear end of the concave and supported independently of the straw table, said grate normally extending upward and backward to a point above the forward end of the straw table, and means, independent of the means for vibrating the straw table, for throwing the rear edge of the grate up and down, substantially as set forth.

3. In a thrashing machine, the combination with the thrashing cylinder, the concave, the straw table behind the cylinder, and means for reciprocating the straw table, of the grate hinged to the concave at the rear end thereof and extending partially over the straw table, and means, independent of the mechanism for reciprocating the straw table, for causing the grate to vibrate at a speed greater than that of said straw table, substantially as set forth.

4. The combination with the thrashing cylinder, the concave, and the vibrating straw carrier in rear of the cylinder of the rotary beater, the vibrating grate behind the concave, and supported independently of the vibrating carrier and the vibrating mechanism engaging therewith and actuated from the beater shaft, substantially as set forth.

5. In a thrashing machine, the combination with the thrashing mechanism, and the vibrating straw table, of the curtain or deflector for the grain berries having a wall approximately vertical, and having a continuously moving carrier independent of the straw table adapted to advance the straw, substantially as set forth.

6. The combination with the thrashing machine, and the rotary beater, of the curtain or grain deflector having a vertical wall in the path of the grain berries, and an endless belt carrier moving downward between the curtain and beater oppositely to the grain beater to uniformly advance the straw, substantially as set forth.

7. The combination with the thrasher mechanism, the beater the vibrating grate interposed between the thrashing mechanism and the beater, the grain pan and the reciprocating separating tables at the rear, of the supplemental reciprocating table adjacent to the beater and arranged to advance the straw longitudinally thereof without materially moving it toward or from the beater, and means independent of the grain pan for supporting the supplemental reciprocating table, as set forth.

8. In a thrashing machine, the combination with the cylinder and concave, of the two separating tables F, G, arranged one above the other, the rock shaft journaled below the forward ends of said tables, arms $h$ carried by said shaft and pivotally connected to both the separating tables at points both on the same side of the axis of said arms $h$, rocker arms $H^2$ beneath the rear ends of the tables and connected to both of them at points on the same side of the axis of said arms $H^2$, the distance from the axis of the arms $h$ to the lower table being the same as the distance from the axis of the arms $H^2$ to said table, and the distance of the axis of the arms $H^2$ from the upper table being greater than that from the axis of the arms $h'$ to said upper table, substantially as set forth.

9. In a thrashing machine, the combination with the thrashing mechanism, of the two separating tables F, G, arranged one above the other, the rock shaft $H'$ below the forward ends of said tables, the arms $h$, carried by said shaft and pivotally connected to both tables on points on the same side of the axis of said arms, rocker arms $H^2$ beneath the rear ends of the tables and pivoted to the lower table G, arms $F^2$ connected to the table F and pivotally connected to the arms $H^2$, both tables being on the same side of the axis of the arms $H^2$, and means for rocking the arms $h$, substantially as set forth.

10. In a thrashing machine, the combination with the thrashing mechanism, and the rotary beater, of the relatively elongated main straw separating table in the rear of the beater, means for reciprocating said table longitudinally, means for vibrating vertically the rear end of said table relatively to its forward end, whereby the straw is carried backward with a lesser vertical movement at first, and a more violent vertical motion finally, and a short supplemental table $D'$ beneath the beater reciprocating approximately rectilineally in substantially the plane occupied by the forward end of the main table when the latter is in its elevated position and adapted to, at that time, have its rear edge lie in close proximity to the inner edge of the main table, substantially as set forth.

11. In a thrashing machine, the combination with the thrashing mechanism, of the main straw table F adapted to reciprocate both longitudinally and vertically through a relatively long path, and the inner supplemental table $D'$ adapted to reciprocate approximately rectilineally and in the same directions as the table F, the forward end of the table F when in its lower position extending under the table D', and lying in substantially the same plane with said table D' when in its upper position, and means for simultaneously reciprocating said tables in the same directions, substantially as set forth.

12. In a thrashing machine, the combination with the thrashing mechanism, and the rotary beater, of the two separating tables F, G, arranged one above the other, means for reciprocating the said tables simultaneously longitudinally in the same directions, means for vibrating the rear end of the upper table vertically relatively to its forward end, the supplemental table D' below the beater supported independently of the tables F and G and reciprocating longitudinally in the same directions with them, and the link G³ connecting said table D' with the devices which reciprocate the tables F and G, and adapted to impart to said table D' a relatively shorter throw than that imparted to the upper table F, substantially as set forth.

13. In a thrashing machine, the combination with the cylinder, the concave, the beater, and the straw carrier N', of the separating mechanism arranged between the beater and straw carrier, and adapted to be vibrated longitudinally and vertically, the supplemental separating table D' arranged below the beater and vibrating in a path tangential thereto, the apron or deflector E arranged in rear of the beater, and the endless carrier F' traveling around said deflector and extending over the forward portion of the main separating mechanism in a line parallel to the path of the supplemental separating table D', substantially as set forth.

14. In a thrashing machine, the combination with the thrashing mechanism, of the two separating tables F, G, arranged one above the other and supported on the same side of a common axis of vibration at their forward ends and supported on the same side of another common axis at their rear ends, means for reciprocating both tables simultaneously in the same directions, means for throwing upward the rear end of the upper table independently of its forward end, and a grain receptacle counterbalancing the said two tables and supported from the said axes but on the sides thereof opposite to those whereon lie the said tables, and moving oppositely thereto, substantially as set forth.

In testimony whereof I affix my signature in presence of two witnesses.

GEORGE E. WILSON.

Witnesses:
ADA E. OSBORNE,
A. F. SANFTENBERG.